(12) United States Patent
Millward et al.

(10) Patent No.: US 10,697,076 B2
(45) Date of Patent: Jun. 30, 2020

(54) DUCT ASSEMBLY AND METHOD OF FORMING

(71) Applicant: Unison Industries, LLC, Jacksonville, FL (US)

(72) Inventors: David William Millward, Washington Township, OH (US); Donald Lee Templeton, Beavercreek, OH (US); Daniel Dyer, Dayton, OH (US); Emily Marie Phelps, Bellbrook, OH (US)

(73) Assignee: Unison Industries, LLC, Jacksonville, MI (US)

( * ) Notice: Subject to any disclaimer, the term of this patent is extended or adjusted under 35 U.S.C. 154(b) by 18 days.

(21) Appl. No.: 15/940,325

(22) Filed: Mar. 29, 2018

(65) Prior Publication Data

US 2019/0301037 A1 Oct. 3, 2019

(51) Int. Cl.
| | |
|---|---|
| C25D 1/02 | (2006.01) |
| C25D 7/04 | (2006.01) |
| B22F 5/00 | (2006.01) |
| F01D 25/12 | (2006.01) |
| F02C 7/14 | (2006.01) |
| F02C 7/00 | (2006.01) |

(52) U.S. Cl.
CPC ............... C25D 1/02 (2013.01); B22F 5/009 (2013.01); C25D 7/04 (2013.01); F01D 25/12 (2013.01); F02C 7/14 (2013.01); F05D 2230/31 (2013.01); F05D 2230/90 (2013.01); F05D 2300/171 (2013.01)

(58) Field of Classification Search
CPC .. C25D 1/02; C25D 7/04; B22F 5/009; F01D 25/00; F01D 25/12; F02C 7/00; F02C 7/14; F05D 2230/10; F05D 2230/21; F05D 2230/30; F05D 2230/31; F05D 2230/90; F05D 2300/171
See application file for complete search history.

(56) References Cited

U.S. PATENT DOCUMENTS

| | | |
|---|---|---|
| 314,528 A | 3/1885 | Hardy |
| 315,628 A | 4/1885 | Jacobsen |
| 315,681 A | 4/1885 | Von Hollen |
| 316,569 A | 4/1885 | Reynolds |
| 317,921 A | 5/1885 | Brown |
| 318,604 A | 5/1885 | Devereux |
| 320,600 A | 6/1885 | Stoetzel |
| 691,803 A | 1/1902 | Patton |
| 1,282,269 A | 10/1918 | Merritt |
| 1,694,962 A | 12/1928 | Berry |
| 2,181,257 A | 11/1939 | Arbogast |

(Continued)

FOREIGN PATENT DOCUMENTS

| | | |
|---|---|---|
| EP | 1336810 A2 | 8/2003 |
| FR | 2331690 A1 | 6/1977 |
| GB | 2194552 A1 | 3/1988 |

*Primary Examiner* — Bayan Salone
(74) *Attorney, Agent, or Firm* — McGarry Bair PC

(57) ABSTRACT

Duct assembly and method of forming a duct assembly, the method including providing a preform having a unitary body with multiple sleeve sections defining multiple apertures, disposing multiple sacrificial mandrel pieces adjacent the preform body such that at least one of the multiple sacrificial mandrel pieces abuts at least one of the multiple sleeve sections, and forming the duct assembly to define a unitary metallic tubular element.

20 Claims, 9 Drawing Sheets

(56) References Cited

U.S. PATENT DOCUMENTS

| | | | |
|---|---|---|---|
| 2,287,122 A | 6/1942 | Norris | |
| 2,761,828 A | 9/1956 | Ginzton | |
| 3,022,230 A | 2/1962 | Fialkoff | |
| 3,308,879 A | 3/1967 | Maddocks | |
| 3,554,874 A | 1/1971 | Mattia | |
| 3,910,039 A | 10/1975 | Fortini | |
| 4,156,306 A | 5/1979 | Seidel | |
| 4,214,945 A | 7/1980 | Lucas | |
| 4,255,237 A | 3/1981 | Duerr | |
| 4,417,854 A | 11/1983 | Cain | |
| 5,293,922 A * | 3/1994 | Imai | C25D 1/02 164/132 |
| 5,698,086 A | 12/1997 | Herbert | |
| 6,582,542 B1 | 6/2003 | Russell | |
| 6,904,756 B2 | 6/2005 | Mack | |
| 7,712,789 B2 | 5/2010 | Heuer | |
| 8,636,485 B2 | 1/2014 | Steele | |
| 9,284,654 B2 | 3/2016 | Saucy | |
| 9,365,941 B2 | 6/2016 | Saucy | |
| 9,624,779 B2 | 4/2017 | Cui | |
| 2008/0078554 A1 * | 4/2008 | Huff | B23K 9/18 166/363 |
| 2011/0062112 A1 | 3/2011 | Saucy | |
| 2014/0202170 A1 * | 7/2014 | Cook, III | F02C 7/04 60/805 |
| 2015/0096631 A1 | 4/2015 | Regan | |
| 2016/0003257 A1 * | 1/2016 | Palomba | B23K 20/12 416/189 |
| 2016/0281532 A1 | 9/2016 | Rambo | |
| 2016/0312614 A1 | 10/2016 | Kinstler | |
| 2017/0291214 A1 | 10/2017 | Roberge | |

\* cited by examiner

DUCT ASSEMBLY AND METHOD OF FORMING

BACKGROUND

Duct assemblies are used in a variety of stationary and mobile applications. For example, contemporary engines used in aircraft can include fluid passageways for providing flow from a fluid source to a fluid destination. In one non-limiting example, a bleed air system can receive pressurized bleed air from a compressor section of an engine and convey to a fluidly downstream component or system, such as an environmental control system. Additional fluid passageways can be utilized for carrying, transferring, or otherwise flowing fluid including, but not limited to, oil, coolant, water, fuel, or the like. In the example of an aircraft engine, the passageways can be exposed to high pressures, high temperatures, stresses, vibrations, thermal cycling, and the like. The passageway, or other component formed in a similar process, can be configured, designed, or arranged to provide reliable operation in the functional environment. The complexity and spacing requirements of the turbine engine often require particular ducting paths and structural attachments to the engine case in order to accommodate other engine components and maintain appropriate safety margins for the duct.

BRIEF DESCRIPTION

In one aspect, the disclosure relates to a method of forming a duct assembly. The method includes providing a preform having a unitary body with multiple sleeve sections defining multiple apertures and wherein the preform defines an interior surface and an exterior surface, disposing multiple sacrificial mandrel pieces adjacent the preform body such that at least one of the multiple sacrificial mandrel pieces abuts at least one of the multiple sleeve sections, forming the duct assembly by depositing metal on the multiple sacrificial mandrel pieces and the preform body to define a unitary metallic tubular element with the preform body and where depositing metal occurs at a temperature that does not damage the multiple sacrificial mandrel pieces, and removing the multiple sacrificial mandrel pieces to define the duct assembly.

In another aspect, the disclosure relates to a duct assembly. The duct assembly includes a preform having a unitary body with multiple sleeve sections and wherein the preform defines an interior surface and an exterior surface, and a duct section including a metal layer unitarily formed with the preform and defining a fluid passageway.

DETAILED DESCRIPTION

Figure 1:
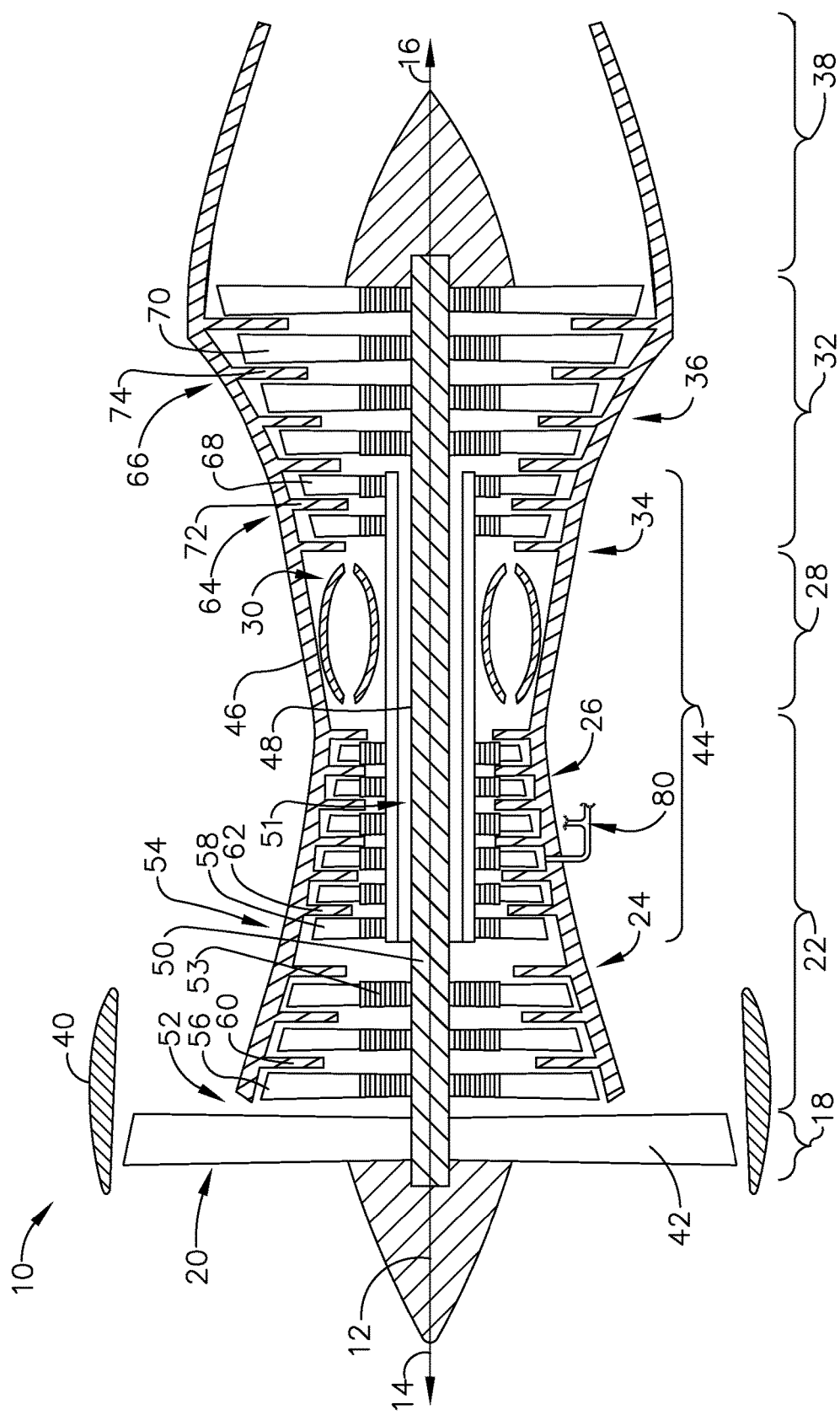
FIG. 1 is a schematic cross-sectional view of a gas turbine engine with a duct assembly in accordance with various aspects described herein.

Aspects of present disclosure are directed to a duct assembly, ducting, or conduit for providing a flow of fluid. Such duct assembly can be configured to provide a fluid flow from one portion of an engine to another. The duct can include at least one branched portion, such as to accommodate an inlet fluid flow branching into multiple outlet flows.

For purposes of illustration, the present disclosure will be described with respect to a gas turbine engine. Gas turbine engines have been used for land and nautical locomotion and power generation, but are most commonly used for aeronautical applications such as for airplanes, including helicopters. In airplanes, gas turbine engines are used for propulsion of the aircraft. It will be understood, however, that the disclosure is not so limited and can have general applicability in non-aircraft applications, such as other mobile applications and non-mobile industrial, commercial, and residential applications. Additionally, the described embodiments will have equal applicability to any ducting system experiencing high system loading or large thrust and shear loads requiring a flex joint to connect elements.

As used herein, the term "forward" or "upstream" refers to moving in a direction toward the engine inlet, or a component being relatively closer to the engine inlet as compared to another component. The term "aft" or "downstream" used in conjunction with "forward" or "upstream" refers to a direction toward the rear or outlet of the engine relative to the engine centerline. Additionally, as used herein, the terms "radial" or "radially" refer to a dimension extending between a center longitudinal axis of the engine and an outer engine circumference. Further, the terms "inlet" and "outlet" will refer to a fluid flow entry portion and exit portion, respectively. In an example where a fluid flow direction is changed, it can be appreciated that a former inlet can become an outlet, and vice versa.

All directional references (e.g., radial, axial, proximal, distal, upper, lower, upward, downward, left, right, lateral, front, back, top, bottom, above, below, vertical, horizontal, clockwise, counterclockwise, upstream, downstream, aft, etc.) are only used for identification purposes to aid the reader's understanding of the present disclosure, and do not create limitations, particularly as to the position, orientation, or use of the disclosure. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. In addition, as used herein, being "flush" with a given surface will refer to being level with, or tangential to, that surface.

Furthermore, "sacrificial" as used herein can refer to an element, component, or material composition that can be removed. Non-limiting examples of "sacrificial" elements can include a melt-able composition such as wax or plastic, a low melting temperature alloyed metal, or a dissolvable composition. In this sense, the "sacrificial" element can be removed by way of melting when exposed to a heating element, or dissolved when exposed to a dissolving agent. Additional or alternative non-limiting aspects of sacrificial element removal can be included, such as mechanical disassembly, or physically removing elements or sub-elements.

The exemplary drawings are for purposes of illustration only and the dimensions, positions, order, and relative sizes reflected in the drawings attached hereto can vary.

FIG. 1 is a schematic cross-sectional diagram of a gas turbine engine 10 for an aircraft. The engine 10 has a generally longitudinally extending axis or centerline 12 extending from forward 14 to aft 16. The engine 10 includes, in downstream serial flow relationship, a fan section 18 including a fan 20, a compressor section 22 including a booster or low pressure (LP) compressor 24 and a high pressure (HP) compressor 26, a combustion section 28 including a combustor 30, a turbine section 32 including a HP turbine 34, and a LP turbine 36, and an exhaust section 38.

The fan section 18 includes a fan casing 40 surrounding the fan 20. The fan 20 includes a set of fan blades 42 disposed radially about the centerline 12. The HP compressor 26, the combustor 30, and the HP turbine 34 form a core 44 of the engine 10, which generates combustion gases. The core 44 is surrounded by core casing 46, which can be coupled with the fan casing 40.

A HP shaft or spool 48 disposed coaxially about the centerline 12 of the engine 10 drivingly connects the HP turbine 34 to the HP compressor 26. A LP shaft or spool 50, which is disposed coaxially about the centerline 12 of the engine 10 within the larger diameter annular HP spool 48, drivingly connects the LP turbine 36 to the LP compressor 24 and fan 20. The portions of the engine 10 mounted to and rotating with either or both of the spools 48, 50 are also referred to individually or collectively as a rotor 51.

The LP compressor 24 and the HP compressor 26 respectively include a set of compressor stages 52, 54, in which a set of compressor blades 58 rotate relative to a corresponding set of static compressor vanes 60, 62 (also called a nozzle) to compress or pressurize the stream of fluid passing through the stage. In a single compressor stage 52, 54, multiple compressor blades 56, 58 can be provided in a ring and can extend radially outwardly relative to the centerline 12, from a blade platform to a blade tip, while the corresponding static compressor vanes 60, 62 are positioned downstream of and adjacent to the rotating blades 56, 58. It is noted that the number of blades, vanes, and compressor stages shown in FIG. 1 were selected for illustrative purposes only, and that other numbers are possible. The blades 56, 58 for a stage of the compressor can be mounted to a disk 53, which is mounted to the corresponding one of the HP and LP spools 48, 50, respectively, with stages having their own disks. The vanes 60, 62 are mounted to the core casing 46 in a circumferential arrangement about the rotor 51.

The HP turbine 34 and the LP turbine 36 respectively include a set of turbine stages 64, 66, in which a set of turbine blades 68, 70 are rotated relative to a corresponding set of static turbine vanes 72, 74 (also called a nozzle) to extract energy from the stream of fluid passing through the stage. In a single turbine stage 64, 66, multiple turbine blades 68, 70 can be provided in a ring and can extend radially outwardly relative to the centerline 12, from a blade platform to a blade tip, while the corresponding static turbine vanes 72, 74 are positioned upstream of and adjacent to the rotating blades 68, 70. It is noted that the number of blades, vanes, and turbine stages shown in FIG. 1 were selected for illustrative purposes only, and that other numbers are possible.

In operation, the rotating fan 20 supplies ambient air to the LP compressor 24, which then supplies pressurized ambient air to the HP compressor 26, which further pressurizes the ambient air. The pressurized air from the HP compressor 26 is mixed with fuel in the combustor 30 and ignited, thereby generating combustion gases. Some work is extracted from these gases by the HP turbine 34, which drives the HP compressor 26. The combustion gases are discharged into the LP turbine 36, which extracts additional work to drive the LP compressor 24, and the exhaust gas is ultimately discharged from the engine 10 via the exhaust section 38. The driving of the LP turbine 36 drives the LP spool 50 to rotate the fan 20 and the LP compressor 24.

Some of the air from the compressor section 22 can be bled off via one or more duct assemblies 80, and be used for cooling of portions, especially hot portions, such as the HP turbine 34, or used to generate power or run environmental systems of the aircraft such as the cabin cooling/heating system or the deicing system. In the context of a turbine engine, the hot portions of the engine are normally downstream of the combustor 30, especially the turbine section 32, with the HP turbine 34 being the hottest portion as it is directly downstream of the combustion section 28. Air that is drawn off the compressor and used for these purposes is known as bleed air.

Additionally, the ducts, or metal tubular elements thereof, can also be a fluid delivery system for routing a fluid through the engine 10, including through the duct assemblies 80. The duct assemblies 80, such as air duct or other ducting assemblies leading either internally to other portions of the turbine engine 10 or externally of the turbine engine 10, can also include one or more metal tubular elements or metallic tubular elements forming ducts or conduits configured to convey fluid from a first portion of the engine 10 to another portion of the engine 10. It is further contemplated that the duct assemblies 80 can form branches, such as a first branch being fluidly coupled to a second branch at an intersection, or multiple branches sharing a common intersection, a common inlet, or a common outlet, in non-limiting examples.

Figure 2:
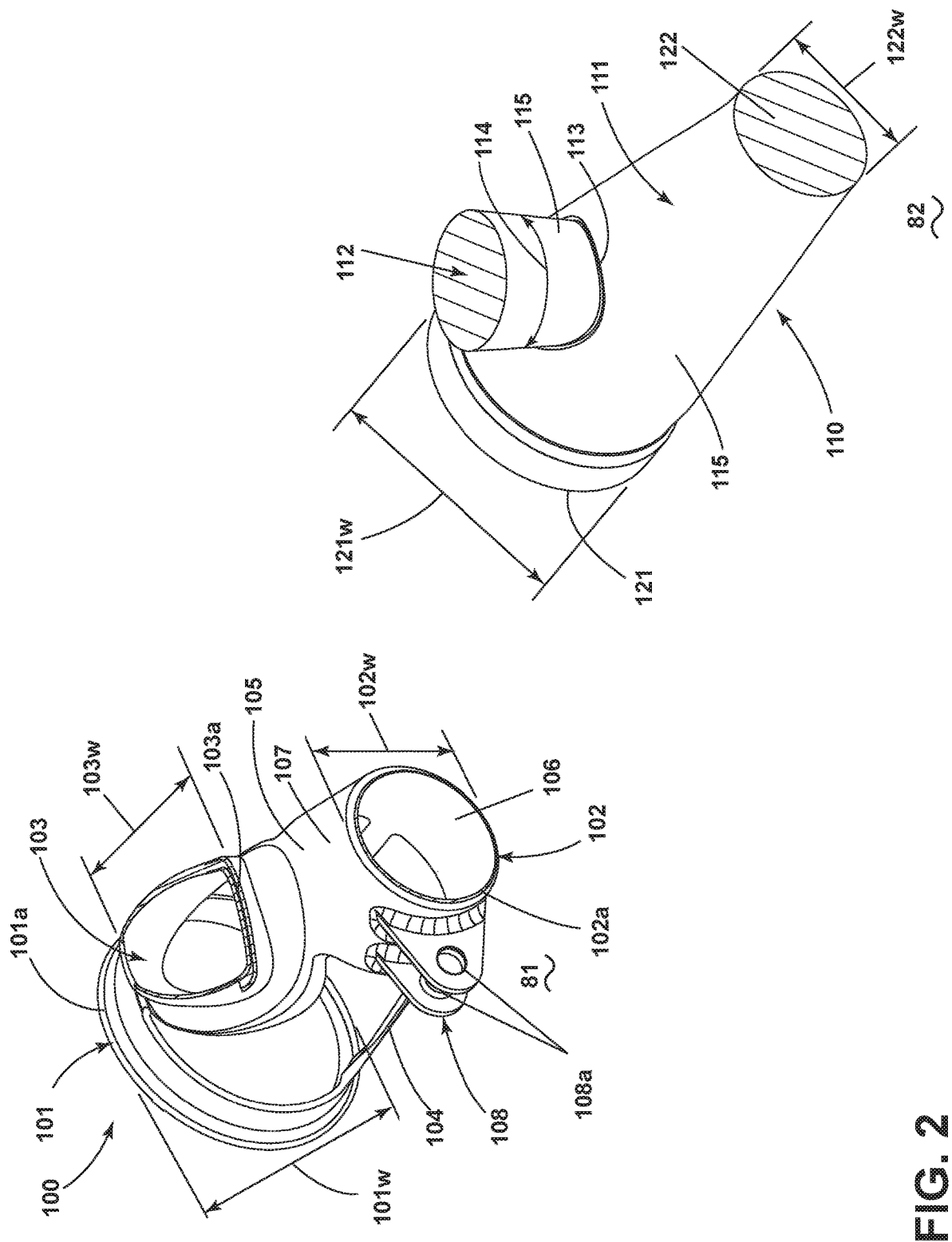
FIG. 2 illustrates perspective views of a preform and mandrel that can be utilized to form the duct assembly of FIG. 1.

Turning to FIG. 2, an exemplary preform is illustrated that can form a portion of the duct assembly 80. In the illustrated example, the preform 100 in a first view 81 has a unitary body with multiple sleeve sections defining multiple apertures. More specifically, a first sleeve section 101 is illustrated as defining a first aperture 101a having a first width 101w. A second sleeve section 102 is aligned with the first sleeve section 101 and defines a second aperture 102a having a second width 102w smaller than the first width 101w. A third sleeve section 103 defining a third aperture 103a having a third width 103w is illustrated as being positioned between, and perpendicular to, the first sleeve sections 101 and the second sleeve sections 102. The apertures 101a, 102a, 103a, 108a are illustrated as substantially circular, although it will be understood that other profiles may also be utilized such as square, rounded, or irregular. In this manner, the preform 100 can take any suitable form utilized for positioning, attaching, or otherwise locating, a portion of the duct assembly 80.

At least one connecting band 104 extends between the first and second sleeve sections 101, 102. Furthermore, in the illustrated example the first sleeve section 101 shares a common portion 105 with the third sleeve section 103, though this need not be the case. Either or both of the connecting bands 104 and common portion 105 can define a seam section; in this manner, multiple sleeve sections in the unitary preform body can be spaced from each other and connected via a seam section, and multiple gaps can be formed between the multiple sleeve sections.

It is contemplated that the first, second, and third sleeve sections 101, 102, 103 can define a respective inlet sleeve section, first outlet sleeve branch, and second outlet sleeve branch of the unitary preform body 100. In such a case, the inlet sleeve section can have an inlet aperture as illustrated by the first aperture 101a, and the first and second outlet sleeve branches can each have a respective first and second outlet aperture as illustrated by the second and third apertures 102a, 103a, respectively. In another non-limiting example, the first and third sleeve sections 101, 103 can each define inlet sleeve sections while the second sleeve section 102 can define an outlet sleeve section depending on a flow of fluid therethrough. It will be understood that the preform can include any number of multiple sleeve sections defining any number of apertures and that the multiple sleeve sections can form branches in a variety of orientations to server various purposes during operation. The perform 100 is one exemplary preform having one exemplary configuration of multiple sleeve sections.

The preform 100 can further include an interior surface 106 and an exterior surface 107. A clevis 108 can be disposed on the exterior surface 107. Clevis apertures 108a can be included as illustrated. Regardless, the clevis 108 can be configured to receive fasteners such as bolts or screws such that the preform 100 can be configured to attach or otherwise fasten to a portion of the aircraft engine 10 (FIG. 1).

It is contemplated that the preform 100 can be made of any suitable material for the environment, non-limiting examples of which include sheet metal, steels, nickel or its alloys, or aluminum or its alloys. Alternatively, the preform 100 can be utilized to provide strength, rigidity, reliability, resilience, or the like. The preform 100 can be formed in a variety of methods, non-limiting examples of which include direct metal laser melting (DMLM), laser-cutting, additive manufacturing, machining, or machine casting.

A second view 82 illustrates a sacrificial mandrel 110 that can be utilized in forming at least a portion of the duct assembly 80. The sacrificial mandrel 110 itself can be formed via additive manufacturing, injection molding, or any other suitable process. The sacrificial mandrel 110 can include, by way of non-limiting examples, materials such as plastics/polymers, wax, aluminum, or other low melting point metals. Furthermore, the sacrificial mandrel 110 can be formed having any desired or predetermined geometry for forming a shape, profile, or contour of the duct assembly 80 in combination with the preform 100.

The sacrificial mandrel 110 includes multiple mandrel pieces and is illustrated in the second view 82 as including a first mandrel 111 and a second mandrel 112, each having exposed exterior surfaces 115. The first mandrel 111 includes a first end 121 with a first end width 121w, as well as a second end 122 with a second end width 122w smaller than the first end width 121w. The first mandrel 111 can also include a mandrel aperture 113 configured to receive the second mandrel 112. The second mandrel 112 can have a circumferential profile 114 complementary to that of the mandrel aperture 113 and has been illustrated as essentially round. It will be understood that the first and second mandrels 111, 112, as well as the mandrel aperture 113 and profile 114, can include any suitable profile, shape, or dimension.

Figure 3:
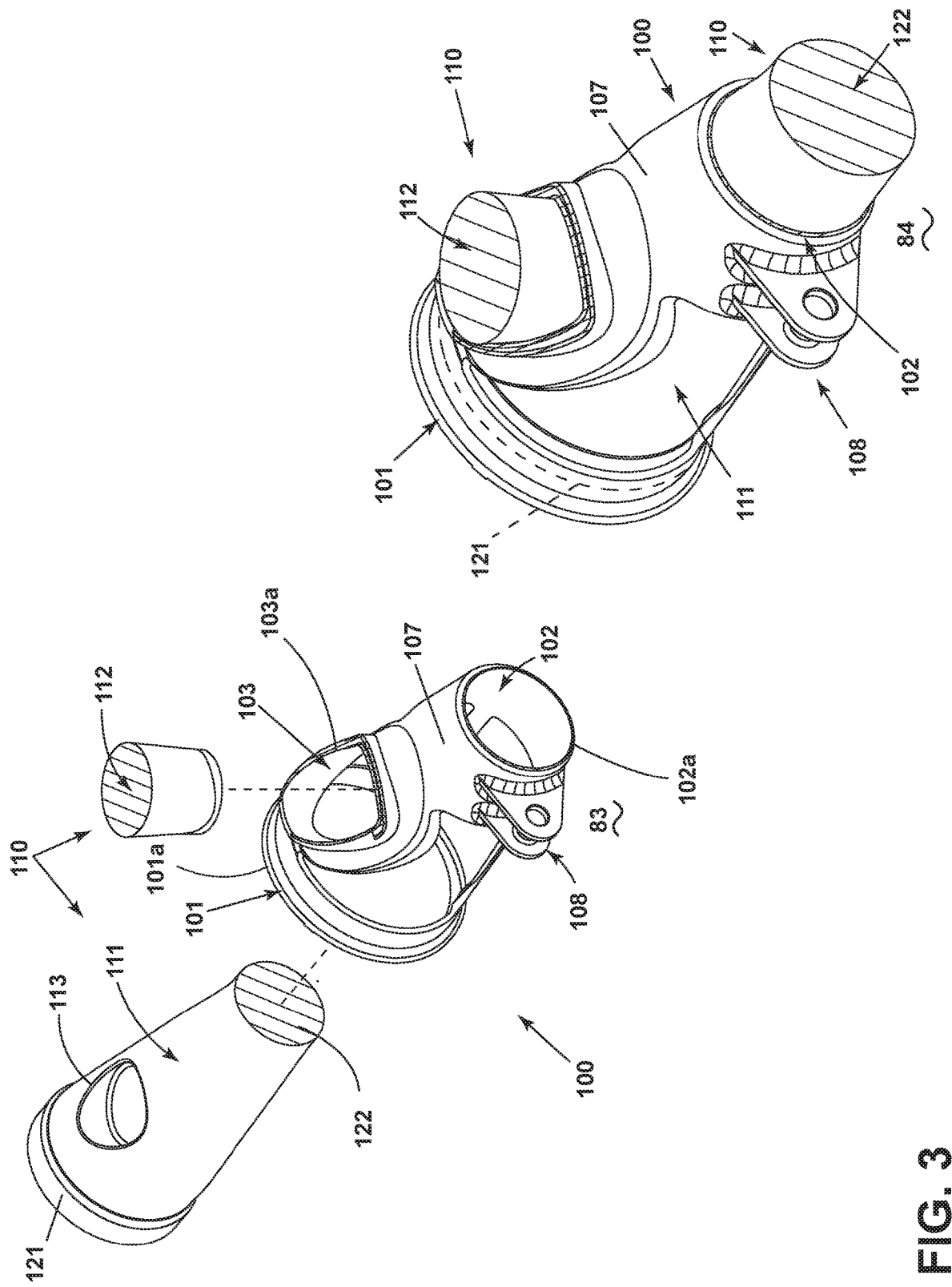
FIG. 3 illustrates a partially-exploded view and an assembled view of the preform and mandrel of FIG. 2.

Moving to FIG. 3, the sacrificial mandrel 110 can be disposed, positioned, configured, or arranged relative to the preform 100, as shown in an exploded third view 83. More specifically, the first mandrel 111 can be inserted into the preform 100 with the second end 122 in registry with the first and second sleeve sections 101, 102. The second mandrel 112 can be inserted through the third sleeve section 103 and mandrel aperture 113.

A fourth view 84 illustrates the assembled preform 100 and sacrificial mandrel 110. The first end 121 is within the first sleeve section 101 to fill the first aperture 101a (see the third view 83), and the second end 122 extends through the second sleeve section 102 to fill the second aperture 102a. The third sleeve section 103 can surround at least a portion of the second mandrel 112 after insertion of the second mandrel 112 into the mandrel aperture 113, thereby filling the third aperture 103a (see the third view 83).

Figure 4:
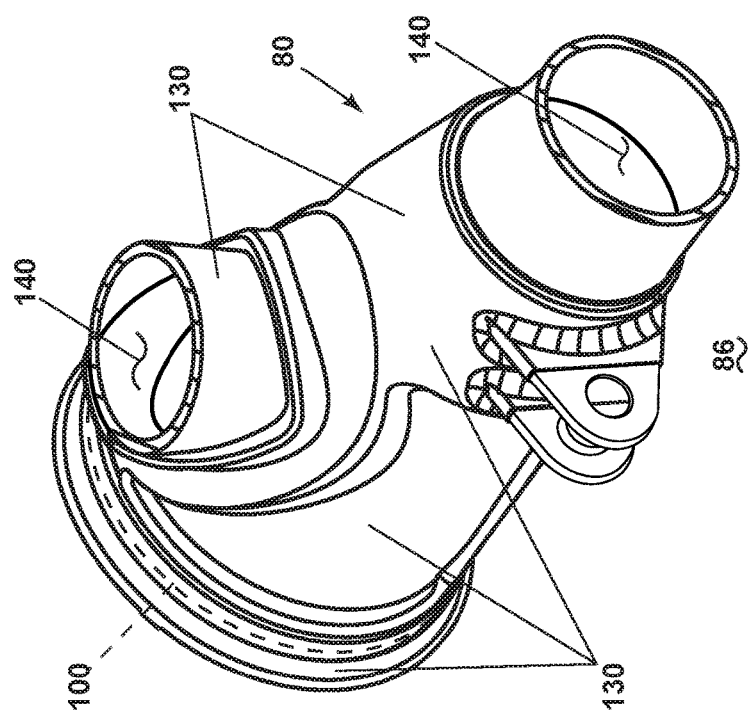
FIG. 4 illustrates perspective views of a partially-formed and completed duct assembly utilizing the preform and mandrel of FIG. 2.
Figure 4:
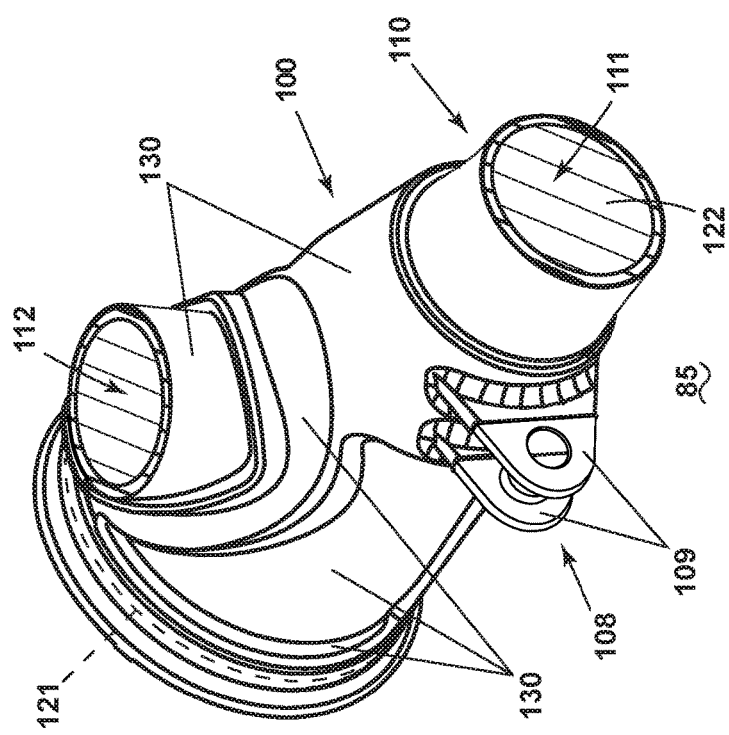

Referring now to FIG. 4, a fifth view 85 illustrates a partially formed duct assembly 80 formed about the preform 100 and the sacrificial mandrel 110. More specifically, an electroforming process can create or form a metal layer 130 over the exterior surface 107 of the preform 100 as well as over exterior surfaces of the sacrificial mandrel 110. It is contemplated that any desired portion of the exposed exterior surfaces 107 (FIG. 2) of the preform 100 and exposed exterior surfaces 115 (FIG. 2) of the sacrificial mandrel 110 can be covered by the metal layer 130, including fully or partially covering the preform 100. In the illustrated example, a portion 109 of the clevis 108, as well as the first and second ends 121, 122 of the first mandrel 111 are each left uncovered by the metal layer 130 (e.g. by masking during the electroforming process), though this need not be the case. In this manner, the deposited metal layer can fully or partially cover each of the sacrificial mandrel 110 and preform 100 as desired. Other examples in the spirit of the present disclosure are contemplated for use.

As used herein, "electroforming" or "electrodeposition" can include any process for building, forming, growing, or otherwise creating a metal layer over another substrate or base. Non-limiting examples of electrodeposition can include electroforming, electroless forming, electroplating, or a combination thereof. While the remainder of the disclosure is directed to electroforming, any and all electrodeposition processes are equally applicable. In one non-limiting example of an electroforming process, the preforms 100, and sacrificial mandrel 110 can be submerged in an electrolytic liquid and electrically charged. The electric charge of the preforms 100 and sacrificial mandrel 110 can attract an oppositely charged electroforming material through the electrolytic solution. The attraction of the anodic material to the exposed surfaces of preforms 100 and sacrificial mandrel 110 ultimately deposits the electroforming material on the exposed surfaces creating the metal layer 130 to form the duct assembly 80.

In non-limiting examples, electroforming material can include nickel and nickel alloys, iron and iron alloys, or the like, or a combination thereof. In another non-limiting example, at least a portion of the exposed surfaces of the preforms 100 and sacrificial mandrel 110 can include a metalized layer prior to the electroforming process.

FIG. 4 illustrates in a sixth view 86 the fully-formed duct assembly 80 when the sacrificial mandrel 110 is removed. The sacrificial mandrel 110 can be removed, by way of non-limiting examples, by application of heat or a chemical flush. The duct assembly 80 is formed as a unitary metallic tubular element having a fluid passageway 140 defined therein by portions of the metal layer 130 and portions of the preform 100. The metal layer 130 and the preform 100 completely fuse during the electroforming thus providing a unitary, integral, monolithic structure and providing the duct assembly 80 itself with structural integrity. In this manner, the metal layer 130 and the preform 100 define the fluid passageway 140.

Aspects of the disclosure can be included wherein the preform 100 is configured or formed and then disposed relative to, located, or arranged proximate to a pre-identified high stress area of the partially-formed duct assembly 80. By locating the preform 100 on the sacrificial mandrel 110 prior to electrodeposition, a load bearing structure for a predetermined load path, thicker metal, or an additional insert can be included in the finished duct assembly 80 where needed. The preform 100 can be designed to reduce and distribute stresses to the electroformed metal layer 130. For example, the unitary clevis 108 in the duct assembly 80 can eliminate any unwanted mode shapes from high-cycle vibrations by providing an additional structural attachment for the duct assembly 80. The additional attachment can provide adequate stiffness to the duct assembly and shift the assembly's natural mode frequency out of the engine excitation range (e.g. by increasing the natural mode frequency). This in turn can reduce or eliminate unwanted stresses during operation of the engine 10.

Figure 5:
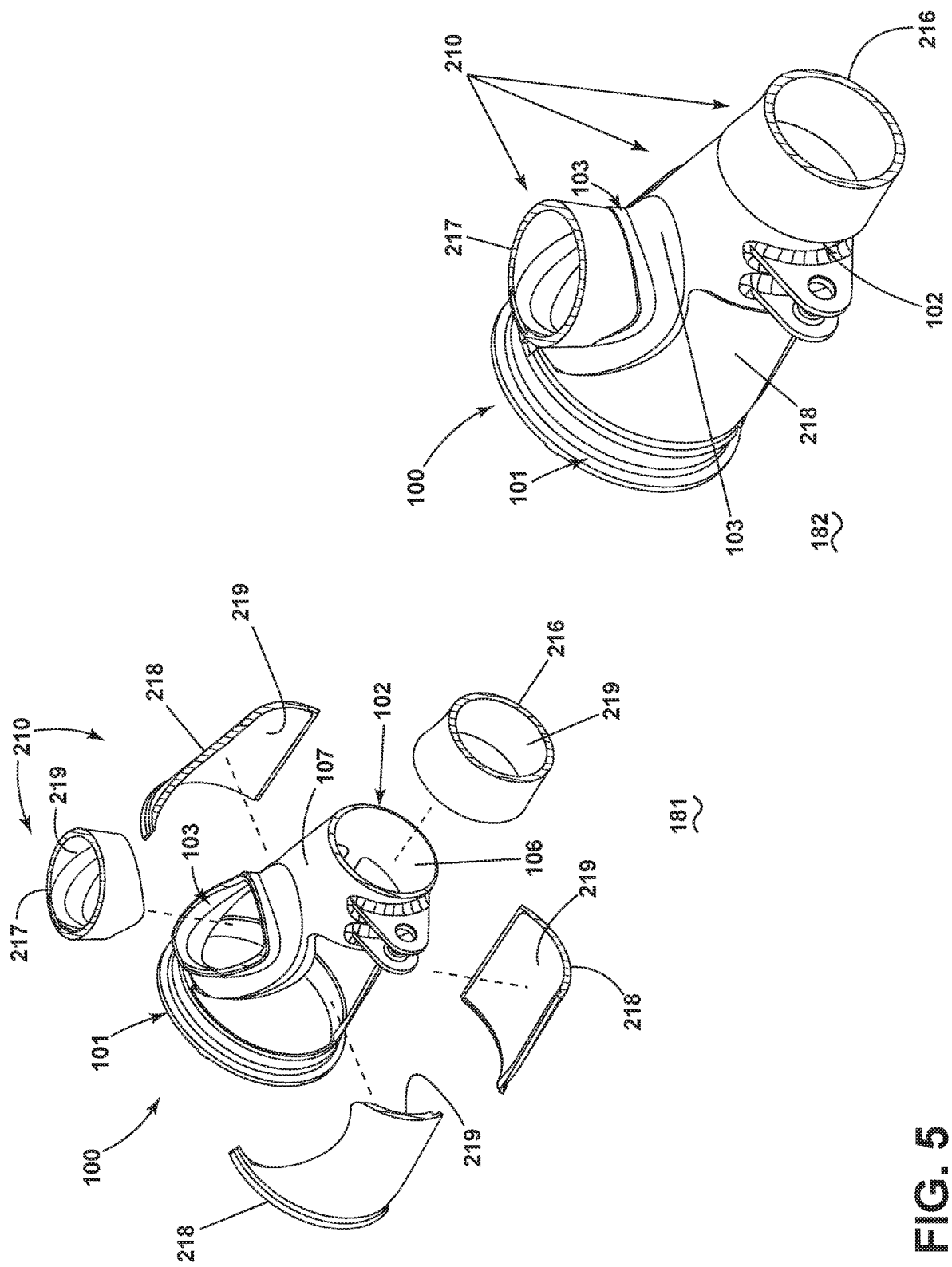
FIG. 5 illustrates partially-exploded and perspective views of another preform that can be utilized to form the duct assembly of FIG. 1.
Figure 6:
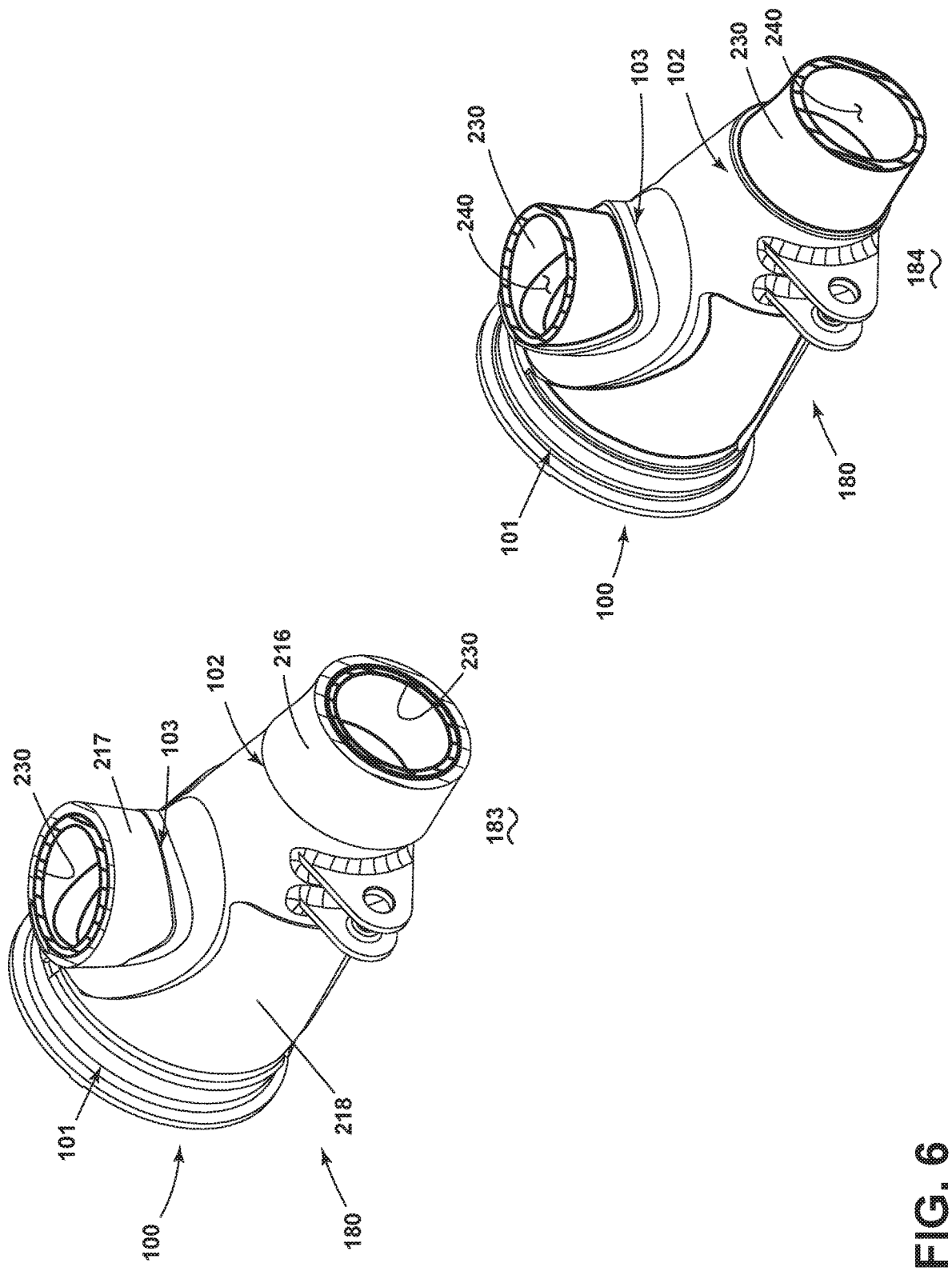
FIG. 6 illustrates perspectives views of a partially-formed and completed duct assembly utilizing the preform of FIG. 2 and mandrel of FIG. 5.

Referring now to FIG. 5, alternative sacrificial mandrels 210 are illustrated that can be utilized with the preform 100 to form a duct assembly 180 (FIG. 6). The duct assembly 180 is similar to the duct assembly 80; therefore, like parts will be identified with like numerals increased by 100, with it being understood that the description of the like parts of the duct assembly 80 applies to the duct assembly 180, except where noted.

A first view 181 illustrates a sacrificial mandrel 210 that can be coupled to the preform 100. One difference is that the sacrificial mandrel 210 includes a plurality of segments, illustrated as a first mandrel segment 216, a second mandrel segment 217, and circumferential third mandrel segments 218. The first mandrel segment 216 can couple to the second sleeve section 102. The second mandrel segment 217 can couple to the third sleeve section 103. The third mandrel segments 218 can couple to the preform 100 and cover or fill the gaps formed between adjacent sleeve sections 101, 102, 103, including by way of fasteners, adhesives, or the like. Furthermore, each of the segments 216, 217, 218 can be formed with inner surfaces 219 as shown.

A second view 182 illustrates the assembled sacrificial mandrel 210 and preform 100. The second and third sleeve sections 102, 103 can be positioned within, or abutting, the respective first and second mandrel segments 216, 217. The circumferential third mandrel segments 218 are coupled to the preform 100 to cover the gaps between the sleeve sections 101, 102, 103. In one non-limiting example, where the sacrificial mandrel 110 is formed via injection molding, sacrificial material can be injected into a mold (not shown) placed around the preform body 100 to form the sacrificial mandrel 210. In one example where the sacrificial mandrel is not formed directly to the preform, it is contemplated that the preform and sacrificial mandrel can be attached in any suitable manner such as via adhesive.

Turning to FIG. 6, a third view 183 illustrates a partially formed duct assembly 180 formed within the preform 100 and the sacrificial mandrel 210. More specifically, an electroforming process can create or form a metal layer 230 over the interior surface 106 of the preform 100 as well as inner surfaces 219 (FIG. 5) of the multi-piece sacrificial mandrel 210. It is contemplated that the segments 216, 217, 218 can be flush with the interior surface 106 of the preform 100 such that the internal metal layer 230 can be smoothly deposited.

In a fourth view 184 of FIG. 6, the sacrificial mandrel 210 can be removed (e.g. by heat, physical removal, chemical flush, or the like as described above. The duct assembly 180 can thus be formed as a unitary metallic tubular element having a fluid passageway 240 defined therein. The metal layer 230 and the preform 100 completely fuse during the electroforming thus providing the duct assembly 180 itself with structural integrity. In this manner, the metal layer 230 can at least partially define a duct section and be unitarily formed with the preform 100 to define the fluid passageway 240.

Figure 7:
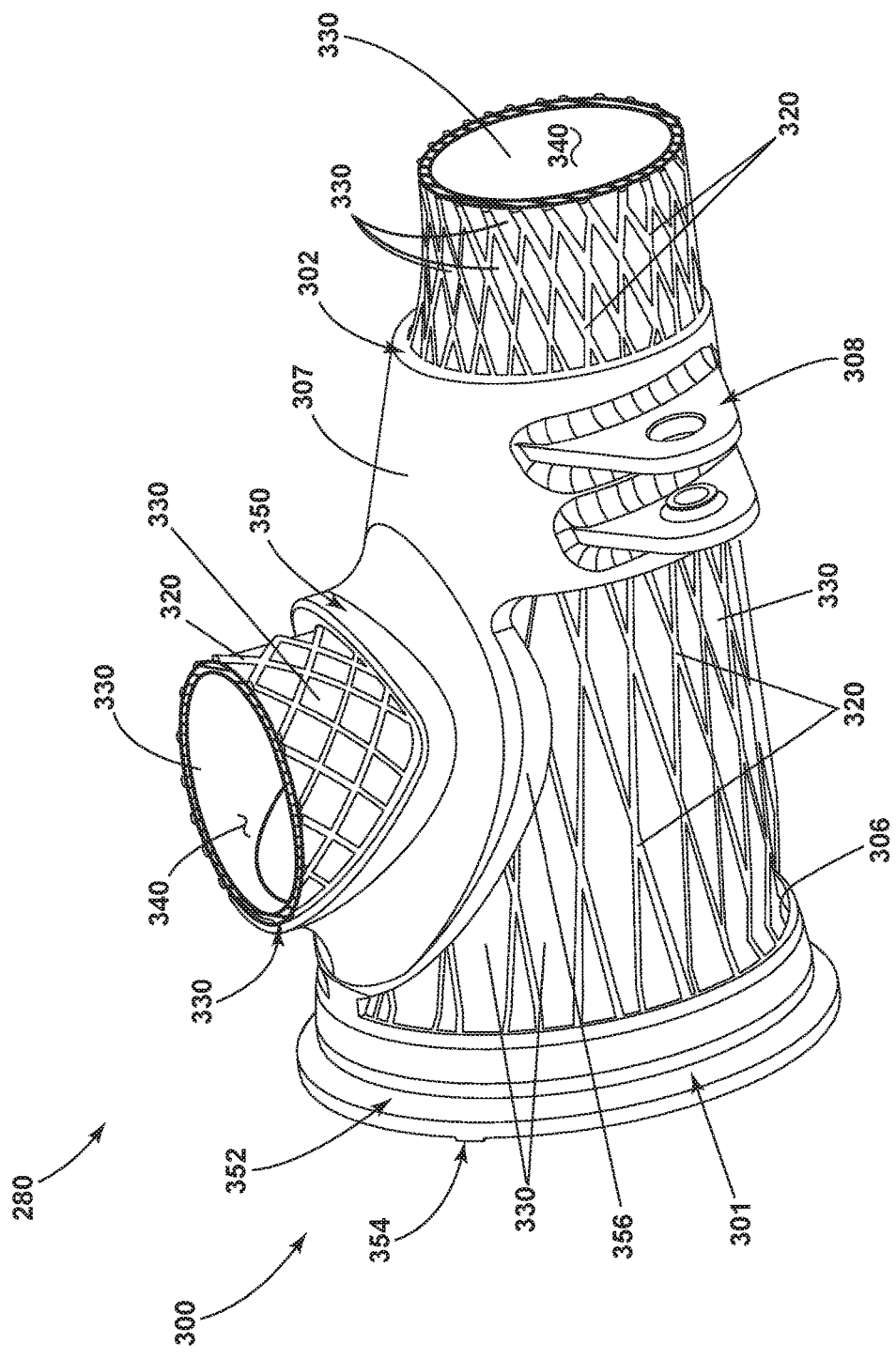
FIG. 7 is a perspective view of another preform that can be utilized to form the duct assembly of FIG. 1.

Turning to FIG. 7, another duct assembly 280 is illustrated that can be utilized in the engine 10. The duct assembly 280 is similar to the duct assembly 180; therefore, like parts will be identified with like numerals increased by 100, with it being understood that the description of the like parts of the duct assembly 180 applies to the duct assembly 280, except where noted.

The duct assembly 280 includes an integral or unitary preform portion 300 formed from a preform similar to the preform 100. One difference is that the preform portion 300 includes a net or web 320 extending between the sleeve sections. It will be understood that the web 320 can extend between any or all of the multiple sections. It is contemplated that the web 320 can be unitarily formed with the sleeve sections including via the use of direct metal laser melting. The web 320 can have any desired orientation, interlocking profile, width, thickness, or the like, and can be tailored based on local stresses or loads predicted to be exerted on the duct assembly 280. In this manner, the unitary body of the preform can include a web between the inlet sleeve section, the first outlet sleeve branch, and the second outlet sleeve branch as described above.

The duct assembly 280 is illustrated after removal of a sacrificial mandrel (not shown). In a manner similar to that described above, a metal layer 330 can be formed over interior surfaces 306 of the preform 300 and mandrel (not shown). The metal layer 330 is illustrated with bold lines at second and third sleeve sections 302, 303. It should be understood that, while not shown in bold line, the metal layer 330 is also visible (e.g. "peeking through") through open portions of the web 320. Thus the metal layer 330 defines a branched fluid passageway 340 strengthened by the web 320. It can be appreciated that the web 320 provides for increased rigidity along the while using as little material as possible, reducing costs.

It is further contemplated that the preform 300 can include a tee take-off feature 350, which is illustrated on the third sleeve section 303. The tee take-off feature 350 can be utilized for fitting the duct assembly 280 to another duct section or assembly (not shown) in accordance with known methods of pipe fitting. The preform 300 can also include a V-band flange 352 and a locator key 354, both illustrated on the first sleeve section 301. The V-band flange 352 can be formed as a stepped feature on the preform 300, such as for locating or fitting within another duct section or assembly (not shown). The locator key 354 can be positioned on a sleeve section, including on the V-band flange 352, for coupling with a keyway (not shown) during fitting. It will be understood that the tee take-off feature 350, V-band flange 352, and locator key 354 are contemplated for use on any desired portion of the preform 300, including the first, second, and third sleeve sections 301, 302, 303.

Additionally, the preform 300 can include at least one transitional surface 356, illustrated in one example as being proximate the third sleeve section 303 and forming a smooth transition to the web 320 and metal layer 330. It will be understood that the use of a straight-edge interface between components can, in some instances, result in a higher current density during the electroforming process, producing a greater electroformed metal layer thickness area proximate to that edge. Thus, aspects of the disclosure can be included wherein component edges can be configured, selected, or the like, to include beveled, blended, or radial edges configured or selected to ensure a uniform expected electroformed metal layer. As a step or ledge between the electroformed metal layer and the preform is undesirable, the preform can include a transitional surface or edge providing a smooth transition between one of its sides and the surface of the sacrificial mandrel. "Smooth transition" as used herein will refer to a layer thickness decreasing toward zero in a direction toward a distal edge of the structure. The transitional surface or smooth transition can also be referred to in the art as a knife edge. The tapering of the body allows the preform to more seamlessly be formed with the mandrel or the metal layer in order to smoothly direct stresses between electroformed part and the preform. This makes the final part more durable as a result.

It should be appreciated that the duct assembly 80 as shown represents only a portion of the duct, and the duct assembly 80 including the electroformed portions and the preform section can be shorter or longer, including more or different profiles, thicknesses, turns, or cross-sectional areas. It should be further appreciated that any duct described herein, can include a variable thickness along one or more portions of the duct. The variable thickness can have increased thicknesses locally to increase strength or durability of the duct, such as at portions encountering heightened operational temperatures or stresses, or at turns along the duct. Such variable thicknesses can provide for a duct having variable thermal or mechanical properties. For example, a duct having an increased thickness can provide for improved structural integrity in order to operate under heightened stresses or loads. In another example, the duct can have a decreased thickness, which can provide for improved heat transfer along the duct. Such an implementation may be beneficial in the use of heat exchangers. Furthermore, the variable profiles and thicknesses can include dimples, or structures that can enhance thermal transfer of the fluid at the duct. For example, the variable profile can include helical ribs to turbulate a fluid travelling within or around the duct. Additionally, the variable thickness can also include lesser thicknesses to decrease engine weight or increase local convective transfer. It should be further appreciated that the duct assembly can include any suitable type of varying profile. Such a varying profile can include different profile shapes, different cross-sectional areas, different thicknesses, or a combination thereof. The varying profiles can improve local strength, can be adapted based upon local thermal needs, or can be adapted to fit into crowded areas of the engine.

It will be understood that the preform can be a preform body used, among other areas, at high stress areas. As used herein, a "high stress area" can refer to an area or a portion of the duct assembly expected, designed, or intended to experience higher stress compared with non-high-stress portions of the duct assembly. For instance, the high stress area can be a result of the geometric configuration of the duct assembly, or connections thereto. Non-limiting examples of stress can include vibration, torque, pressure, thermal cycling, or the like, and can be based at least partially on an operating environment of the duct assembly. The stress can affect the duct assembly, resulting in, for example, component failure, fatigue, deformation, damage, or the like. The stress can affect the duct assembly instantaneously during duct assembly operations, or over an elongated period of time. In this sense, a "high stress area" can include a position or location that can to fail due to stresses experienced.

Aspects of the disclosure can be included wherein the disposing of the preform proximate or relative to the high stress area can provide structural support or integrity to counter the stresses experienced at the high stress area. Stated another way, the preform enables, provides for, or allows the duct assembly to be better suited to resist failure at the high stress area. In another example, the preform can have a greater thickness in anticipated areas of load path, e.g. fluid flow path loads, as compared to the remainder of the preform.

In still another example where a DMLM preform is utilized, a primary load path within the duct assembly can be determined by an initial predictive analysis to understand where the high stress load path is through a duct assembly with no preform included. The predictive analysis can be updated after adding material to the duct, e.g. the DMLM preform material, and simultaneously leaving a minimum amount of electrodeposited material that still meets pressure requirements within the duct. The DMLM preform can thus support large interface loads and minimize load impact on the electroformed metal layer.

Figure 8:
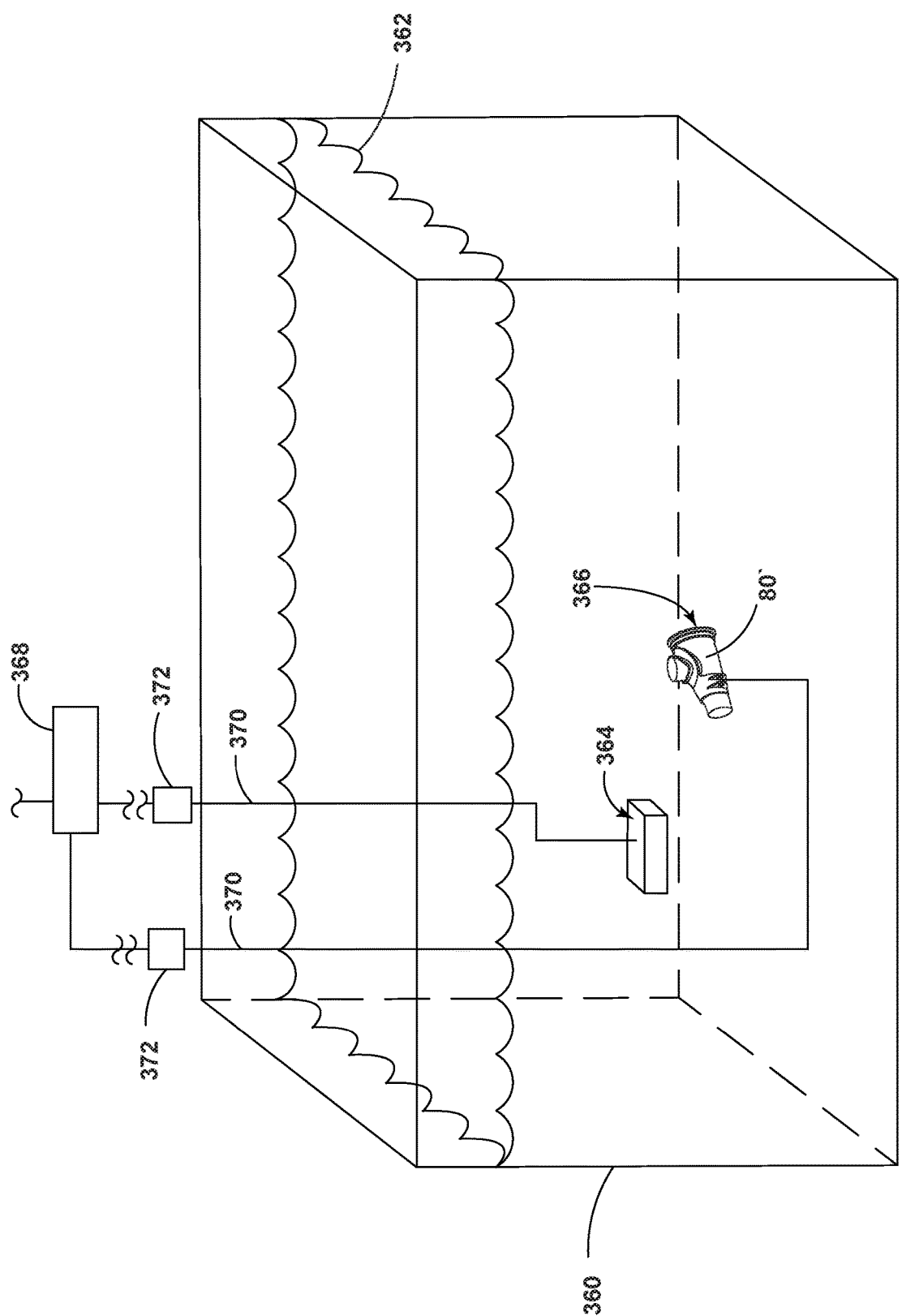
FIG. 8 is a schematic diagram of an electroforming bath for forming the duct assembly of FIG. 1.

The electroforming process is illustrated by way of an electrodeposition bath in FIG. 8. An exemplary bath tank 360 carries a single metal constituent solution 362. The single metal constituent solution 362, in one non-limiting example, can include nickel alloy carrying alloying metal ions. An anode 364 spaced from a cathode 366 is provided in the bath tank 360. The anodes 364 can be sacrificial anodes or an inert anode. While one anode 364 is shown, it should be understood that the bath tank 360 can include any number of anodes as desired. The duct assembly 80, 180, 280, including the preform 100, 200, 300 and mandrel 110, 210, 310 can form the cathode 366, having electrically conductive material. It is also contemplated that a conductive spray or similar treatment can be provided to the duct assembly 80, 180, 280, preform 100, 200, 300, or mandrel 110, 210, 310 to facilitate formation of the cathode 366. In addition, while illustrated as one cathode 366, it should be appreciated that one or more cathodes are contemplated for use in the bath tank 360.

A controller 368, which can include a power supply, can electrically couple to the anode 364 and the cathode 366 by electrical conduits 370 to form a circuit via the conductive metal constituent solution 362. Optionally, a switch 372 or sub-controller can be included along the electrical conduits 370 between the controller 368, anode 364, and cathode 366. During operation, a current can be supplied from the anode 364 to the cathode 366 to electroform a monolithic body at the duct assembly 80, 180, 280. During supply of the current, nickel or nickel alloy from the single metal constituent solution 362 form a metallic layer, such as the metal layers described above to form a duct assembly having a preform that includes a unitary monolithic body. The process described allows for electroforming sections with thicker material by using the preform bodies, this in turn places material in the areas with the highest stress allowing for optimized weight control. The preform bodies can expedite the electroforming process allowing less time in the bath tank to achieve the desired thicknesses. Faster runs in the bath tank in turn result in lower cost. Stress risers associated with attachment hardware, mounting holes, or rivets in sheet metal doublers would be eliminated.

It is further contemplated that the electroforming process can be selected, controlled, or the like, to ensure at least a minimal electroformed material thickness over each exposed surface of the preform and sacrificial mandrel. For example, the electroformed material thickness can be less than the preform body thickness. In this sense, the primary structural support at the high stress area can be provided by the preform body as opposed to the electroformed metal layer, where the electroformed metal layer can provide the primary structural support for non-high-stress areas. Thus, non-limiting aspects of the disclosure can be included wherein the electroforming material, or the electroformed material thickness is selected based on desired operating aspects of the duct assembly, including but not limited to, pressure, fluid type, fluid temperature, the like, or a combination thereof. Likewise, non-limiting aspects of the disclosure can be included wherein the preform body, or preform body thickness, can be selected based on the same electroformed material considerations or the expected stresses described herein, or a combination thereof. In this manner a high stress area of the metallic tubular element can be identified prior to forming the preform body, and a thickness of the preform body can thus be increased at the high stress area as compared to another portion of the preform body.

Figure 9:
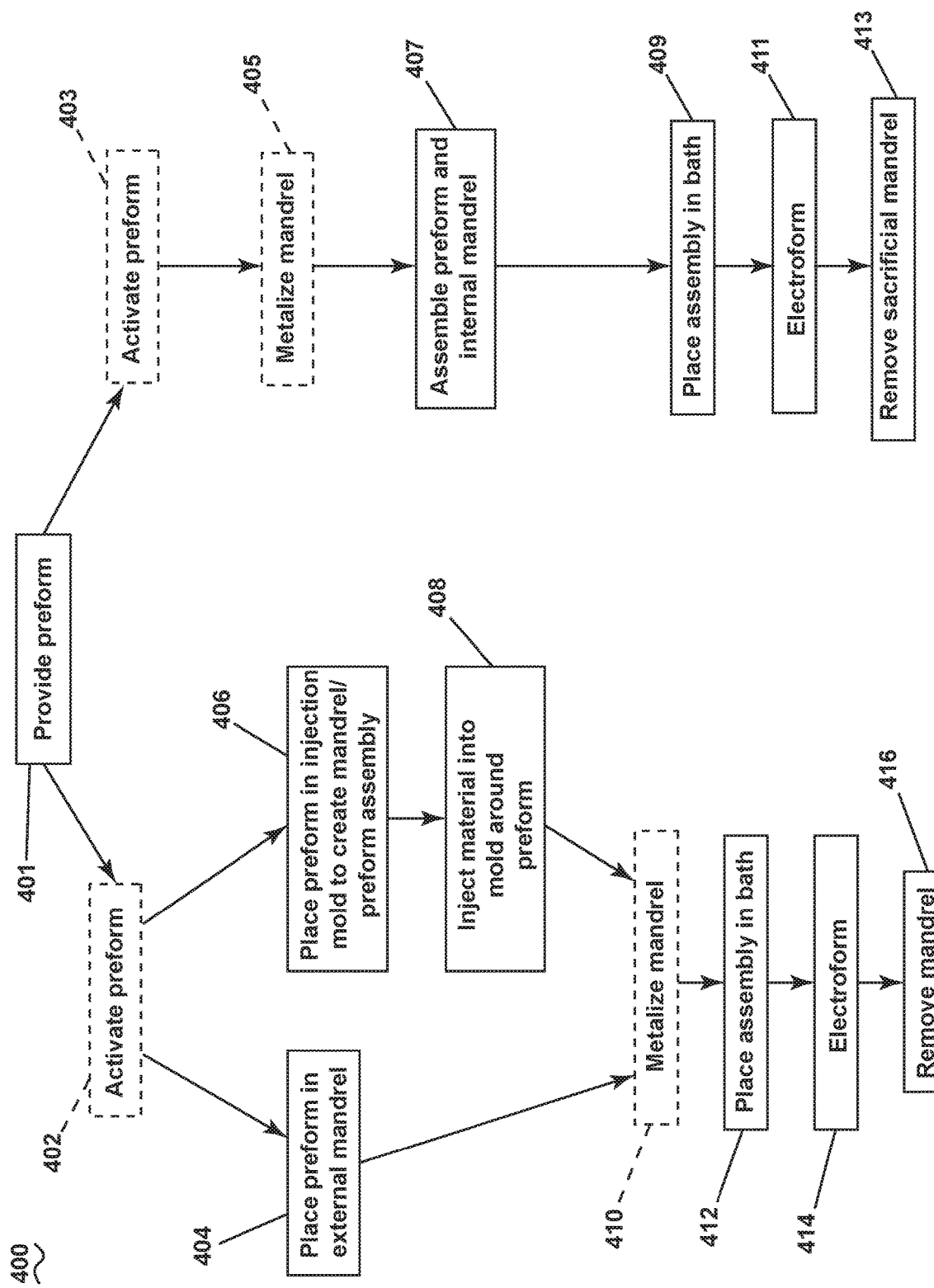
FIG. 9 is a flow chart diagram demonstrating a method for forming the duct assembly of FIG. 1.

FIG. 9 illustrates a flow chart demonstrating a method 400 of forming a duct assembly, such as the duct assembly 80, 180, 280 described above. The method 400 begins at 401 providing the preform having a unitary body with multiple sleeve sections defining multiple apertures, where the preform also defines interior and exterior surfaces. In addition, the preform can be formed by direct metal laser melting (DMLM) as described above.

In one example, the preform can optionally be activated at 402 in preparation for metallization, e.g. by removing oxides or performing surface cleaning. The preform can be placed in an external mandrel at 404, where multiple sacrificial mandrel pieces can be disposed adjacent the preform body such that at least one of the multiple sacrificial mandrel pieces abuts at least one of the multiple sleeve sections. The external mandrel can be a reusable mandrel, such as a metal, plastic, or acrylonitrile butadiene styrene (ABS) reusable mandrel. Alternately, the preform can be placed in an injection mold at 406 to create a mandrel/preform assembly, where sacrificial material is injected at 408 into the mold around the preform to create the mandrel/preform assembly.

At 410, the mandrel can optionally be metalized, such as by electrodeposition or application of silver or nickel paint, in non-limiting examples. Then at 412, the preform/mandrel assembly can be placed in an electrodeposition bath as described above. At 414, a metal layer can be electroformed over interior surfaces of the preform, and at 416 the mandrel can be removed such as by physical removal (e.g. with a reusable mandrel), or by dissolving or melting as described above. Thus the multiple sacrificial mandrel pieces can be removed to define the duct assembly.

In another example, the preform can optionally be activated at 403, and at least one internal mandrel can be optionally be metalized at 405. The mandrel can be assembled within the preform at 407, and the mandrel/preform assembly can be placed in an electrodeposition bath at 409. At 411 a metal layer can be electroformed over exterior surfaces of the preform and mandrel, including all exterior surfaces or a portion thereof as described above. At 411 the internal mandrel can be removed to define the duct assembly.

Thus, the method 400 provides for the formation of a duct assembly by depositing metal on the multiple sacrificial mandrel pieces and the preform body to define a unitary metallic tubular element with the preform body. Metal can be deposited on the multiple sacrificial mandrel pieces by depositing on exterior surfaces, such as the exterior surfaces 115 illustrated in FIG. 2, or by depositing on interior surfaces, such as the interior surfaces 219 illustrated in FIG. 5. It is also contemplated that the depositing metal occurs at a temperature that does not damage the multiple sacrificial mandrel pieces. In a non-limiting example wherein the multiple sacrificial mandrel pieces are made of a wax material, the depositing metal can occur at a temperature below that of the wax material's melting point.

The sequence depicted is for illustrative purposes only and is not meant to limit the method 400 in any way, as it is understood that the portions of the method can proceed in a different logical order, additional or intervening portions can be included, described portions of the method can be divided into multiple portions, or described portions of the method can be omitted without detracting from the described method. For example, the method 400 can optionally include identifying a high stress area for the duct assembly of tubular element being formed around the sacrificial mandrel prior to the disposing of the preform body or disposing a preform body having at least one of a beveled, blended, or radial insert edges. In another non-limiting example, the method 400 can include forming the duct, conduit, or tubular element by way of a set or series of metal layers. In yet another non-limiting example of the method 400 can include metalizing the exposed sacrificial material, the preform body, or a combination thereof prior to the electrodeposition process. Further still, the method 400 can include forming a metal layer on the sacrificial mandrel, disposing the preform body adjacent the formed metal layer and forming another layer over the exposed surfaces of the metal layer and the preform body.

It can be appreciated that aspects of the disclosure allow for the attachment of a DMLM primary load path support structure to be attached, externally or internally, to an electrodeposited tube or duct via the electrodeposition process. A DMLM preform can provide structural interfaces such as the clevis, V-band flange, or tee take-off feature, as well as the webbing support to accept loads from such interfaces. This allows for the creation of an inexpensive, continuous tube or duct structure for containment of fluid that is also capable of accepting system pressures or loads.

Many other possible embodiments and configurations in addition to that shown in the above figures are contemplated by the present disclosure. One advantage that can be realized is that the above described aspects have superior structural strength at critical areas, while reducing the total amount of electrodeposited materials or mass at non-critical areas of the duct assembly. A reduction in the total amount of electrodeposited materials or mass reduces the mass of the overall assembly without compromising the integrity of the electrodeposited component. This is particularly advantageous in an aircraft environment where weight is directly tied to efficiency of the aircraft and fuel consumption. Another advantage over comparable elements or methods is that the above described aspects do not require brazing, welding, or doubling plates to reinforce or support the electroformed element, further reducing weight. The preform allows for added thickness in electroformed parts such as conduits including in the highly stressed areas of an electroformed conduit. Further, the preform allows for added thickness where it might be needed for welding or machining secondary operations. Further still, the preform can be utilized as additional attachment points to add stiffness to tune the duct assembly out of unwanted vibrational modes from natural frequencies or otherwise.

Yet another advantage of the above described aspects is by utilizing the electrodeposited processes described, a minimal thickness of the metal layer for component integrity is predictable during forming, further ensuring conduit integrity without adding unnecessary mass, or bulk. When designing aircraft components, important factors to address are size, weight, and reliability. The above described electrodeposited fluid conduit with preform body results in a lower weight, smaller sized, increased performance, and increased integrity system. Reduced weight and size correlate to competitive advantages during flight. Further still, the preform body can be created quickly and cheaply elsewhere if beneficial. Inclusion of the preform with the unitary monolithic duct body can eliminate or reduce stress risers associated with duct geometry, pressure loading, fatigue, attachment brackets, and other sources of load.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Combinations or permutations of features described herein are covered by this disclosure.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of forming a duct assembly comprising:
   disposing at least one sacrificial mandrel relative to a preform, the preform having an interior passage and multiple sleeves defining multiple apertures coupled to the interior passage, such that the at least one sacrificial mandrel extends beyond at least one of the multiple apertures of the multiple sleeves;
   depositing metal on the at least one sacrificial mandrel and the preform, at a temperature that does not damage the sacrificial mandrel, to define a unitary metallic tubular element with the preform and the unitary metallic tubular element having sleeves that are greater in length than the multiple sleeves of the preform wherein each sleeve corresponds to one of the multiple sleeves, with the sleeves of the unitary metallic tubular element defining openings coupled to the interior passage of the preform; and
   removing the sacrificial mandrel after the depositing of the metal to form a fluid passageway through the duct assembly at least partially defined by the deposited metal and preform.

2. The method of claim 1, further comprising forming, via additive manufacturing or injection molding, the at least one sacrificial mandrel having a predetermined geometry.

3. The method of claim 2 wherein the forming via injection molding comprises injecting sacrificial material into a mold around the preform.

4. The method of claim 1 wherein the depositing metal includes electroforming.

5. The method of claim 4 wherein the preform is a metal body including nickel, nickel alloy, or steel.

6. The method of claim 1 wherein providing the preform further comprises forming a preform body via direct metal laser melting.

7. The method of claim 6 further comprising identifying a high stress area of the metallic tubular element prior to forming the preform body and increasing a thickness of the preform body at the high stress area as compared to another portion of the preform body.

8. The method of claim 6 wherein the multiple sleeves of the preform body define an inlet sleeve section having an inlet aperture, a first outlet sleeve branch having a first outlet aperture, and a second outlet sleeve branch having a second outlet aperture.

9. The method of claim 8 wherein the preform body further includes a web between the inlet sleeve section, the first outlet sleeve branch, and the second outlet sleeve branch.

10. The method of claim 8 wherein disposing multiple sacrificial mandrel pieces adjacent the preform body comprises disposing a first sacrificial mandrel into the inlet sleeve section and the first outlet sleeve branch to fill the inlet aperture and the first outlet aperture and disposing a second sacrificial mandrel into the second outlet sleeve branch to fill the second outlet aperture.

11. The method of claim 8 wherein the preform body of the preform further includes at least one of a tee take-off feature, a clevis, a V-band flange, or a locator key.

12. The method of claim 8 wherein the preform body includes at least one transitional surface.

13. The method of claim 1 wherein the multiple sleeves in the preform unitary body are spaced from each other and connected via a seam section and multiple gaps are formed between the multiple sleeves.

14. The method of claim 13 wherein disposing multiple sacrificial mandrel pieces adjacent the preform includes covering the multiple gaps with the multiple sacrificial mandrel pieces respectively and the depositing metal on the sacrificial mandrel and the preform comprises depositing metal on an interior surface of the preform and inner surfaces of the multiple sacrificial mandrel pieces.

15. A duct assembly, comprising:
   a preform having a unitary body with multiple sleeve sections and wherein the preform defines an interior surface and an exterior surface, with a gap formed between at least two of the multiple sleeve sections; and
   a duct section comprising a metal layer unitarily formed with the preform and defining a fluid passageway, with the metal layer closing the gap to at least partially define the fluid passageway.

16. The duct assembly of claim 15 wherein the multiple sleeve sections define an inlet sleeve section, a first outlet sleeve branch, and a second outlet sleeve branch.

17. The duct assembly of claim 16 wherein the unitary body of the preform further includes a web having multiple openings and extending between the inlet sleeve section, the first outlet sleeve branch, and the second outlet sleeve branch.

18. The duct assembly of claim 16 wherein the unitary body of the preform further includes at least one of a tee take-off feature, a clevis, a v-band flange, or a locator key.

19. The duct assembly of claim 16 wherein the metal layer forms the interior surface to define the fluid passageway or forms the exterior surface to define the fluid passageway in conjunction with the preform.

20. The duct assembly of claim 15 wherein the preform has a greater thickness in anticipated areas of load path than in a remainder of the preform.

\* \* \* \* \*